United States Patent
Chatroux et al.

(10) Patent No.: US 9,948,086 B2
(45) Date of Patent: Apr. 17, 2018

(54) PROTECTION OF A POWER SUPPLY INCLUDING A PLURALITY OF BATTERIES IN PARALLEL AGAINST AN EXTERNAL SHORT CIRCUIT

(71) Applicant: COMMISSARIAT A L'ENERGIE ATOMIQUE ET AUX ENERGIES ALTERNATIVES, Paris (FR)

(72) Inventors: Daniel Chatroux, Teche (FR); Sebastien Carcouet, Vif (FR); Julien Dauchy, Moirans (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 344 days.

(21) Appl. No.: 14/889,020

(22) PCT Filed: Apr. 24, 2014

(86) PCT No.: PCT/EP2014/058304
§ 371 (c)(1),
(2) Date: Nov. 4, 2015

(87) PCT Pub. No.: WO2014/180662
PCT Pub. Date: Nov. 13, 2014

(65) Prior Publication Data
US 2016/0087421 A1    Mar. 24, 2016

(30) Foreign Application Priority Data
May 7, 2013   (FR) .................................... 13 54205

(51) Int. Cl.
*H02H 3/00*   (2006.01)
*H02H 3/087*  (2006.01)
(Continued)

(52) U.S. Cl.
CPC ............ *H02H 3/087* (2013.01); *B60L 3/0069* (2013.01); *B60L 3/04* (2013.01); *H01M 2/34* (2013.01);
(Continued)

(58) Field of Classification Search
CPC ...................................................... H02H 3/087
See application file for complete search history.

(56) References Cited

U.S. PATENT DOCUMENTS 6,075,344 A *  6/2000  Kawai .................. H02J 7/0026
                                                         320/128
6,288,881 B1 * 9/2001  Melvin ................. H02J 7/1461
                                                         361/104
(Continued)

FOREIGN PATENT DOCUMENTS

| EP | 0 810 710 | 12/1997 |
| WO | 2011 076257 | 6/2011 |
| WO | 2012 171917 | 12/2012 |

OTHER PUBLICATIONS

International Search Report dated Jul. 2, 2014 in PCT/EP2014/058304 filed Apr. 24, 2014.

*Primary Examiner* — Stephen W Jackson
(74) *Attorney, Agent, or Firm* — Oblon, McClelland, Maier & Neustadt, L.L.P.

(57) ABSTRACT

An electrical installation includes a circuit-breaker having a breaking capacity PdC and a tripping current Is, an ammeter measuring the current, and a DC voltage source comprising batteries connected in parallel and connected in series with the circuit-breaker. The sum of the short-circuit currents of the batteries connected in parallel is higher than the breaking capacity PdC of the circuit-breaker. A plurality of the batteries each includes a respective switch capable of opening a connection between the battery of the same and the circuit-breaker. The electrical installation also includes a
(Continued)

control circuit to detect that the current passing through the circuit-breaker is higher than the tripping current Is and to control the opening of a plurality of the switches in order to apply, through the circuit-breaker, a current higher than the tripping current Is of the same and lower than the breaking capacity PdC of the same.

13 Claims, 3 Drawing Sheets (51) Int. Cl.
  *H02H 7/18* (2006.01)
  *H01M 2/34* (2006.01)
  *B60L 3/00* (2006.01)
  *B60L 3/04* (2006.01)
  *H01M 10/42* (2006.01)

(52) U.S. Cl.
  CPC ............ *H02H 7/18* (2013.01); *B60L 2200/18* (2013.01); *B60L 2200/30* (2013.01); *H01M 2010/4271* (2013.01)

(56) References Cited

U.S. PATENT DOCUMENTS

| | | | |
|---|---|---|---|
| 9,608,430 B2 * | 3/2017 | Duan | ............... H02H 3/087 |
| 2012/0274142 A1 | 11/2012 | Tinglow et al. | |
| 2014/0145725 A1 * | 5/2014 | Eiswerth | ............... B60R 21/017 |
| | | | 324/502 |
| 2014/0167655 A1 | 6/2014 | Chatroux et al. | |

* cited by examiner

PROTECTION OF A POWER SUPPLY INCLUDING A PLURALITY OF BATTERIES IN PARALLEL AGAINST AN EXTERNAL SHORT CIRCUIT

The invention relates to high-power d.c. voltage sources, specifically voltage sources incorporating electrochemical accumulator power batteries connected in parallel. These may be used, for example, in the field of public transport (buses or trolley buses), or in the field of renewable energy storage, in the field of maritime navigation or as standby power supplies for thermal power plants or data centers.

The requisite voltage levels for applications of this type frequently exceed several hundred volts. In most cases, voltage sources of this type are based upon electrochemical accumulators of the lithium-ion type, which are preferred for their substantial energy storage capacity in combination with limited weight and volume. Technologies in the field of lithium-ion iron phosphate (LiFePO4) accumulators are undergoing substantial developments, in the light of their high level of intrinsic safety, at the expense of a slightly inferior energy storage density.

An electrochemical accumulator customarily has a rated voltage of the following order of magnitude:

3.3 V in the case of lithium-ion iron phosphate (LiFePO4) technology, 4.2 V in the case of lithium-ion technology based upon cobalt oxide.

Consequently, in order to achieve the desired voltage levels, numerous electrochemical accumulators are connected in series. In order to achieve high capacities, numerous electrochemical accumulators are arranged in parallel. The combination of a number of accumulators is described as an accumulator battery.

In certain applications, the powers deployed exceed 100 kWh. For example, the following powers may be deployed in storage batteries: 200 kWh for the propulsion of a bus, between 100 kWh and several MWh for a storage facility associated with a renewable energy generator, and over 100 kWh for a standby storage facility in thermal power plants or in an IT environment. It is therefore complicated (specifically in terms of space) and hazardous to manufacture and transport voltage sources of very high capacity in a single unit. For this reason, it is customary to divide voltage sources into a number of batteries, the unit capacity of which is lower than 50 kWh. A number of batteries are then connected in parallel and/or in series, according to the design rating required for the rated voltage and/or the capacity of the voltage source, thereby facilitating the manufacture and transport thereof.

Batteries, specifically those using accumulators of the lithium-ion type, have a very low internal resistance. Accordingly, in case of a short-circuit at the terminals of the voltage source (typically a short-circuit in the electrical installation), the current that the batteries are liable to deliver may reach very high values. For high-power applications, electro-mechanical circuit-breakers are used to protect the electrical installation and electrical loads against short-circuits. Circuit-breakers of this type have a limited breaking capacity. Electro-mechanical circuit-breakers of breaking capacity exceeding 30 kA are exceptionally expensive. Moreover, the breaking capacity of commercial electro-mechanical circuit-breakers is currently limited to a value of 100 kA. In case of an external short-circuit, batteries are liable to deliver a current which exceeds the breaking capacity of the electro-mechanical circuit-breaker, or they dictate the use of an exceptionally expensive electro-mechanical circuit-breaker. Accordingly, the feasibility of an installation which uses d.c. voltage sources of this type, while maintaining compliance with electrical protection standards, is problematic.

Moreover, the short-circuit current delivered by the batteries to the electrical installation must be sufficient to permit the tripping and opening of electro-mechanical circuit-breakers.

Document EP0810710 describes an electric power supply system comprising a voltage source and an electrical load. A semiconductor switch is connected between one pole of the voltage source and the electrical load. The output of the semiconductor switch is connected to a current source. Electrical loads are connected directly to the current source, with no intermediate safety switch. The switch is controlled by a microcontroller, on the basis of a numerical measurement of the current at the output of said switch.

Document WO2011/076257 describes a battery provided with short-circuit protection. The battery comprises elements connected in series, wherein each element incorporates a semiconductor switch. A command circuit is connected to the semiconductor switches for the control of the latter.

Document WO2012/171917 describes a system for the secure connection of battery modules. Each battery element comprises two terminals and a number of electrochemical cells, which apply a voltage between two poles. The module also comprises a safety device, incorporating first and second switches which are connected in series between the first and second poles. A first switch is of the normally closed type, and the second switch is of the normally open type. The normally open switch is configured for the selective mutual connection/isolation of the first pole and the first terminal. The normally closed switch is configured for the selective mutual connection/isolation of the first and second terminals. The control signal for the normally closed switch is a voltage applied by the electrochemical cells.

The invention is intended to resolve one or more of these disadvantages. The invention relates specifically to an electrical installation, as defined in the attached claims.

Further characteristics and advantages of the invention will be clarified by the description thereof which is set out hereinafter, provided by way of indication and not by way of limitation, with reference to the attached drawings, in which.

The invention proposes an electrical installation incorporating a d.c. voltage source comprising electrochemical accumulator batteries connected in parallel, whereby the d.c. voltage source thus formed is connected in series with a circuit-breaker, the breaking capacity of which is lower than the sum of the short-circuit currents of said batteries. By detecting that the current in the circuit-breaker exceeds its tripping current, the opening of respective switches connecting the batteries to the circuit-breaker is initiated, such that the current applied through the circuit-breaker exceeds its tripping current and is lower than its breaking capacity.

Accordingly, it is possible to detect a short-circuit external to the d.c. voltage source within a very short time, and to maintain a current in the circuit-breaker which is sufficiently high to ensure the tripping thereof, and sufficiently low to ensure the opening thereof. In this way, the circuit-breaker continues to provide its safety functions, such as the opening of the circuit (and the absorption of inductive energy upon opening) in the event of a short-circuit, the physical interruption of the circuit and, where applicable, the provision of a facility for the verification of the breaking state by the user. A circuit-breaker having a breaking capacity which is lower than the sum of the short-circuit currents of the batteries in parallel may be used, whilst ensuring the operational safety of the electrical installation. Consequently, the feasibility of high-power electrical installations can be achieved using existing circuit-breakers, or circuit-breakers of lower cost may be used. A straightforward architecture for the electrical installation may be retained. In addition, the selectivity of circuit-breakers of lower rating down-circuit of a main circuit-breaker is retained.

Figure 1:
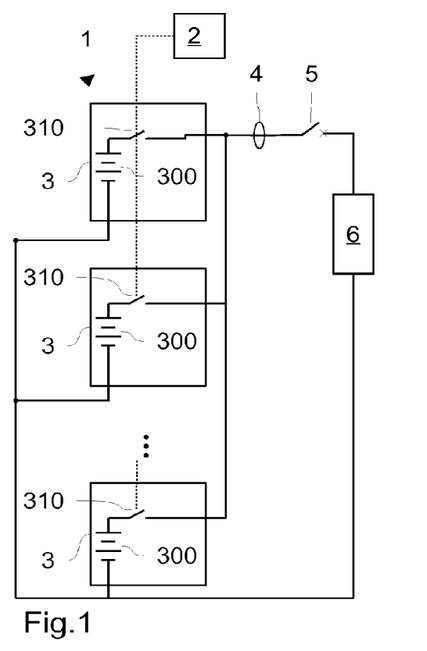
FIG. 1 is a schematic representation of a first mode of embodiment of an electrical installation according to the invention.

FIG. 1 is a schematic representation of a first mode of embodiment of an electrical installation 1 according to the invention. The electrical installation 1 comprises a circuit-breaker 5 and a load 6 connected in series with the circuit-breaker 5. The electrical installation 1 also comprises an ammeter 4 for the measurement of the current flowing in the circuit-breaker 5 and the load 6. The electrical installation 1 also comprises a d.c. voltage source. The d.c. voltage source comprises a combination of batteries 3 (in the form of independent modules) which are electrically connected in parallel. The d.c. voltage source is connected in series with the circuit-breaker 5 and the load 6, for example by means of electric power connections, in a manner known per se.

The circuit-breaker 5 has a breaking capacity PdC and a tripping current Is. For example, the tripping current Is of the circuit-breaker 5 may be provided such that short-circuit tripping occurs within a duration of less than 100 ms, in order to ensure the rapid response of the electrical installation 1 to a short-circuit.

In the electrical installation 1, the sum of the short-circuit currents of the batteries 3 is greater than the breaking capacity PdC of the circuit-breaker 5. With a number n of batteries 3 connected in parallel and designated by an index i, the short-circuit current of a battery i is designated by $I_{cci}$. The breaking capacity PdC then satisfies the following inequality:

$$PdC < \sum_{i=1}^{n} Icc_i$$

The invention is particularly advantageous where at least 10 batteries 3 are connected in parallel. The invention is also particularly advantageous where the batteries 3 are of the lithium-ion type, these batteries having a relatively low internal resistance and, in consequence, a high short-circuit current.

In the interests of simplification, it is assumed that a combination of n batteries 3 exhibits the same short-circuit current Icc. The electrical installation thereby satisfies the relationship PdC<n*Icc.

Accordingly, if all the batteries 3 were to deliver their short-circuit current to the circuit-breaker 5, the opening of the circuit-breaker 5 could not be guaranteed. The short-circuit current of a battery 3 corresponds to the maximum current which it is capable of delivering with zero resistance between these terminals, whereby this current is limited only by the internal impedance of said battery 3.

The invention is particularly advantageous where the current that the combination of batteries 3 could deliver is very substantially in excess of the breaking capacity of the circuit-breaker 5. Accordingly, the invention is particularly advantageous where the following relationship is satisfied:

$$PdC < 3 * \sum_{i=1}^{n} Icc_i$$

Each battery 3 comprises a combination of electrochemical accumulators 300 connected in series and/or in parallel. In the variant shown in FIG. 1, each of the batteries 3 connected in parallel comprises a controlled switch 310. The controlled switch 310 of a battery 3 is connected in series with the combination of accumulators 300, between the terminals of said battery 3. The switch 310 is therefore capable of opening the connection between the battery 3 and the circuit-breaker 5.

The electrical installation 1 also comprises a control circuit 2. The control circuit 2 is configured to maintain the switches 310 in the closed position in the normal operating mode for the supply of power to the load 6. The control circuit 2 is configured for the opening of certain switches 310 under certain operating conditions. On the basis of the current measured by the ammeter 4, the control circuit 2 detects whether the current flowing in the circuit-breaker 5 exceeds its tripping current Is, and will then switch over to a short-circuit operating mode.

In short-circuit mode, the control circuit 2 actuates the opening of a number of switches 310 and actuates the closing of other switches 310 in order to ensure that the current flowing in the circuit-breaker 5 (the sum of the currents delivered by the batteries 3 in parallel) satisfies the following inequalities:

$$Is < \sum_{i=1}^{n} Icc_i < PdC$$

The batteries 3, the switch 310 of which remains closed, deliver a current which may rise to the value of the short-circuit current. A control function of this type thereby guarantees that the batteries 3 deliver a current which is sufficiently high to ensure that the maintenance thereof will initiate the opening of the circuit-breaker 5, and a current which is sufficiently low to ensure that the circuit-breaker 5 is capable of opening. The circuit-breaker 5 is dimensioned such that its breaking capacity remains higher than the sum of the short-circuit currents of the batteries 3, the switch 310 of which remains closed following the switchover to short-circuit operating mode. As the switches 310 may potentially carry the short-circuit current of their battery 3, said switches shall advantageously be dimensioned for a pulse mode current which is equal to said short-circuit current for the maximum duration of the short-circuit.

For simplified control by the circuit 2 upon the detection of an overrun of the tripping current Is, the latter continuously maintains;
a number x of switches 310 open; and
a number (n–x) of switches 310 closed.

However, it might also be envisaged that the circuit 2 executes a permutation of the open and closed switches 310, whilst maintaining x switches 310 open and (n-x) switches closed upon the detection of an overrun of the tripping current Is.

A tolerance to faults in a certain number of switches 310 may also be accommodated at the same time by the natural redundancy of the system, given that:
a number of batteries 3 are connected in parallel;
a design margin is retained between the breaking capacity of the circuit-breaker 5 and the sum of the short-circuit currents of the batteries 3, the switch 310 of which remains closed.

According to one example, 100 batteries 3 are connected in parallel, each with a short-circuit current of 5 kA. The sum of the short-circuit currents of the batteries 3 is therefore 500 kA. The electrical installation 1 comprises a circuit-breaker 5 with a breaking capacity PdC of 100 kA, which is therefore lower than the sum of the short-circuit currents of the batteries 3. When the control circuit 2 switches over to short-circuit mode, it initiates, for example, the opening of 90 switches 310 and the closing of 10 switches 310. The maximum short-circuit current that may flow in the circuit-breaker 5 is therefore 50 kA, which is lower than the breaking capacity PdC. This maximum short-circuit current is also higher than a tripping current of the circuit-breaker 5

The opening of the switches 310 must be completed before a short-circuit induces a current in the circuit-breaker 5 which exceeds its breaking capacity. Given internal inductances of the batteries 3 of the order of several µH, and inductances in the remainder of the electrical installation 1 ranging from several µH to several tens of µH, the rise time of the short-circuit current may range from 10 µs to several hundred µs on certain electrical installations. Examples of switches 310 which are capable of opening within this time are described in detail hereinafter.

Figure 2:
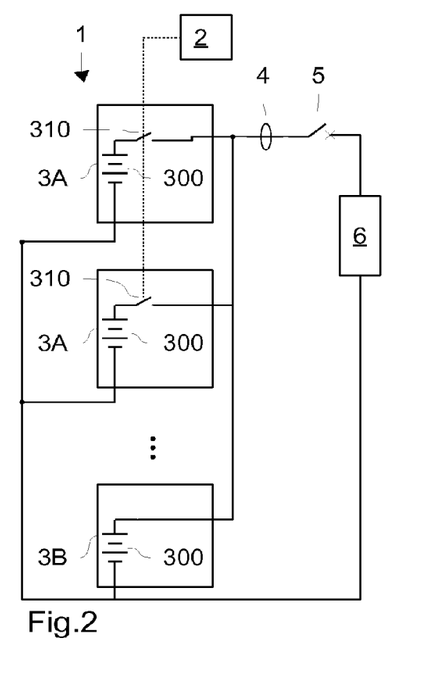
FIG. 2 is a schematic representation of a second mode of embodiment of an electrical installation according to the invention.

FIG. 2 is a schematic representation of a second mode of embodiment of an electrical installation 1 according to the invention. The installation 1 employs the same architecture as the first mode of embodiment, and differs from the first mode of embodiment with respect to the structure of the batteries and the control mode of the circuit 2. The batteries 3 in the first mode of embodiment are replaced by a plurality of batteries 3A and at least one battery 3B connected in parallel.

Each battery 3A comprises a combination of electrochemical accumulators 300 connected in series and/or in parallel. Each of the batteries 3A is provided with a controlled switch 310. The controlled switch 310 of a battery 3A is connected in series with the combination of accumulators 300, between the terminals of said battery 3A. The switch 310 is therefore capable of opening the connection between the battery 3A and the circuit-breaker 5.

Each battery 3B comprises, between its terminals, a combination of electrochemical accumulators 300 connected in series and/or in parallel. Each battery 3B is devoid of any controlled switch for the opening of the connection between itself and the circuit-breaker 5.

The sum of the short-circuit currents of the batteries 3A and 3B is greater than the breaking capacity PdC of the circuit-breaker 5.

The control circuit 2 is configured to maintain the switches 310 of the batteries 3A in the closed position in the normal operating mode for the supply of power to the load 6. The control circuit 2 is configured to switch over to short-circuit mode when the current measured by the ammeter 4 exceeds the tripping current Is of the circuit-breaker 5. In short-circuit mode, the control circuit 2 opens the switches 310 of the batteries 3A. Only the batteries 3B will then supply the current flowing in the circuit-breaker 5.

Given an appropriate distribution between the number of batteries 3A and of batteries 3B, in short-circuit mode, the current flowing in the circuit-breaker 5 satisfies the following inequalities:

$$Is < \sum_{i=1}^{n} Icc_i < PdC$$

In the second mode of embodiment, as the batteries 3A are designed to open almost instantaneously in short-circuit mode, the current flowing in the switches 310 is lower than the short-circuit current for a very brief time, prior to the opening thereof. Consequently, the switches 310 may be dimensioned for a nominal current which is significantly lower than the short-circuit current of their battery. Moreover, as the batteries 3B are devoid of switches 310, the cost of the batteries 3A and 3B in the second mode of embodiment (specifically on the grounds of the dimensioning and the cooling of the switches 310) is restricted.

Figure 3:
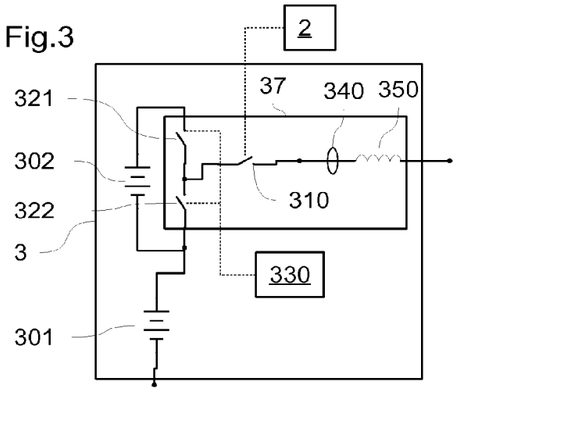
FIG. 3 is a schematic representation of a variant of an electrochemical accumulator battery for an electrical installation according to the invention.

FIG. 3 is a schematic representation of a variant of a battery 3 provided with a switch 310. This battery 3 comprises first electrochemical accumulators 301 connected in series and a d.c./d.c. converter 37. A further d.c. voltage source is connected to the input of the converter 37. In this case, said further d.c. voltage source comprises second electrochemical accumulators 302. The output of the converter 37 is electrically connected in series with the electrochemical accumulators 301.

A battery 3 of this type is capable of adapting its voltage to the voltage of the other batteries to which it is to be connected in parallel. Batteries of this type are particularly advantageous when they exhibit different characteristics (on the grounds of differences in their state of charge, manufacturing scatter, or differences in age and wear). A battery 3 of this type is also capable of adapting its voltage with reduced losses, and with optimum cost and volume requirements. Indeed, conversion is only applied to the voltage of the electrochemical accumulators 302, the rated voltage of which is typically at least five times lower than the rated voltage of the electrochemical accumulators 301.

In this case, the converter 37 is based upon the use of switches 321 and 322 and an inductance 350. The switches 321 and 322 are connected in series and controlled by a control circuit 330. The inductance 350 is connected between an output terminal of the battery 3 and a connection node between the switches 321 and 322. The inductance 350 is connected to the connection node between the switches 321 and 322 via the switch 310. An ammeter 340 measures the current flowing in the switch 310 and the inductance 350. The switch 310 may be arranged at any point on the series connection between the connection node and the output terminal of the battery 3. The combination of electrochemical accumulators 302 is connected to the connection node via the switch 321 and the switch 322 respectively.

The cyclical closing ratio of the switch 321, defined by the control circuit 330, is represented by α. The control circuit 330 defines a cyclical closing ratio for the switch 322 of (1-α). In a manner known per se, the control circuit maintains the switch 321 in the open position and the switch 322 in the closed position simultaneously, and vice versa. The control circuit 330 defines the value of the cyclical ratio α as a function of the required output voltage of the battery 3.

The converter 37 therefore acts as a voltage reducer, where the accumulators 302 are in discharge mode, and as a voltage step-up device, where the accumulators 302 are in charging mode.

Further variants of the converter 37 may naturally be used, such as those detailed in patent application PCT/EP2012/072607.

The inductance 350 permits the slow-down of the rise in current in case of a short-circuit. In order to prevent saturation, the inductance 350 will advantageously be an air core inductance.

In order to facilitate the handling and manufacture of batteries, electrochemical accumulators 302 and electrochemical accumulators 301 may be configured in the form of independent modules, which are electrically connected in series.

Figure 4:
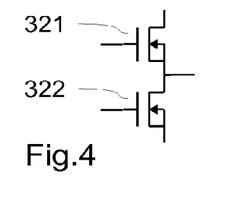
FIG. 4 is a first variant of a commutation circuit for the voltage reducer of the battery shown in FIG. 3.

The switches 321 and 322 of the converter 37 are preferably of the normally open type. FIG. 4 illustrates a first example of switches 321 and 322 which are suitable for use in the converter 37. In this case, the switches 321 and 322 are n-channel MOS transistors connected in series.

Figure 5:
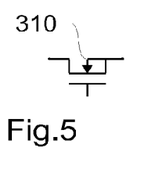
FIG. 5 is a second variant of a commutation circuit for the voltage reducer of the battery shown in FIG. 3.
Figure 6:
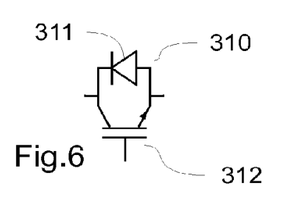
FIG. 6 shows a schematic illustration of a first variant of a controlled switch for a battery.

Different types of transistors may be used as conduction/cut-off components for the switch 310 function. The use of transistors specifically permits the achievement of sufficiently rapid opening speeds of the switches 310 before the current flowing in the circuit-breaker 5 reaches its breaking capacity. Where a battery is to deliver limited power, losses will be limited by the use of an over-dimensioned transistor of the MOSFET type (in which losses are substantially proportional to the square of the current). Where a battery is required to deliver high power, losses will be limited by the use of a transistor of the IGBT type (in which losses are substantially proportional to the current). FIG. 6 illustrates a first example of a transistor 312 which is suitable for use as a switch 310, with an anti-parallel diode 311.

Where the switch 310 incorporates a single conductive MOS transistor, as in the variant shown in FIG. 5, the latter will also exhibit an intrinsic parasitic diode, the cathode of which is connected to the connection node between the transistors 321 and 322, and consequently to the anode of the parasitic diode of the transistor 321. If a further battery 3 connected in parallel exhibits a higher output voltage, there is a risk that a reverse current will flow in the transistor 321, even when the opening thereof is instructed.

Where the switch 310 incorporates a single conductive IGBT transistor with an anti-parallel diode, as in the variant shown in FIG. 6, the cathode of the diode 311 is connected to the connection node between the transistors 321 and 322, and consequently to the anode of the parasitic diode of the transistor 321. There is a risk that a reverse current will flow in the transistor 321, even when the opening thereof is instructed.

A first solution to this problem might be to decouple the batteries 3 (for example, by means of contactors), where the respective voltage levels thereof are not within the same range. A further solution to this problem might be to use other types of switches 310, as illustrated with reference to FIGS. 7 to 9.

Figure 7:
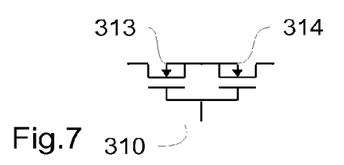
FIG. 7 shows a schematic illustration of a second variant of a controlled switch for a battery.

The switch 310 in the variant shown in FIG. 7 comprises two n-channel MOS transistors 313 and 314, arranged head-to-tail, the gate of which is controlled by the control circuit 2. A switch 310 of this type therefore provides reverse voltage protection, at the expense of conduction losses in normal operation. This solution also permits the controlled recharging of the electrochemical accumulators 301 using energy recovered from the load 6, or by means of a battery in parallel that would exhibit a higher voltage.

Figure 8:
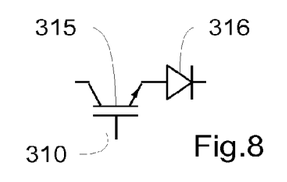
FIG. 8 shows a schematic illustration of a third variant of a controlled switch for a battery.
Figure 9:
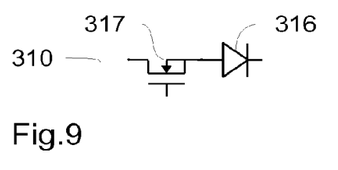
FIG. 9 shows a schematic illustration of a fourth variant of a controlled switch for a battery.

In the absence of the recharging of the accumulators 301 by a current originating from the load 6, for example where the batteries 3 are provided with another recharging device, the variants of the switches 310 shown in FIGS. 8 and 9 may be used. In the variant shown in FIG. 8, the switch 310 comprises an IGBT 315 (this may also be replaced by a bipolar transistor) connected in series with a diode 316. In the variant shown in FIG. 9, the switch 310 comprises an n-channel MOS transistor 317 connected in series to a diode 316. The cathode of said diodes 316 is connected to the high-voltage terminal of the battery 3. The switches 310 in both of these variants therefore provide reverse voltage protection.

The switches 310 are required to dissipate the energy of stray inductances in series upon opening. In order to facilitate this dissipation, the commutation speed of the switches 310 may be limited, or the switches 310 may be provided with respective peak limiters, for example a Zener diode, connected in parallel.

Figure 10:
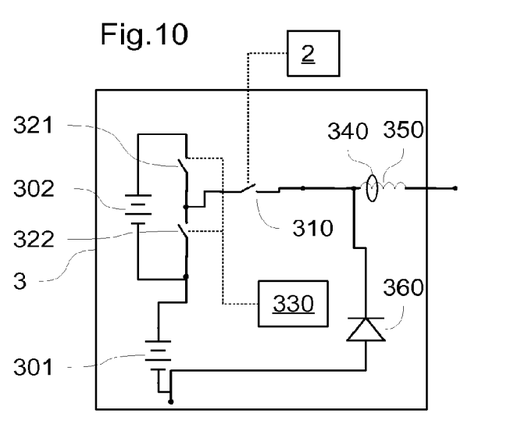
FIGS. 10 and 11 are schematic representations of other variants of electrochemical accumulator batteries for an electrical installation according to the invention.

FIG. 10 is a schematic representation of a further variant of a battery 3, which is designed for the implementation of a third mode of embodiment of an electrical installation 1 according to the invention. The variant shown in FIG. 10 is distinguished from the variant shown in FIG. 3 only in that it comprises a diode 360, the anode of which is connected to the low-voltage terminal of the battery 3, and the cathode of which is connected to a node between the inductance 350 and the switch 310. The diode 360 has a free-wheeling diode function. As in the variant shown in FIG. 3, the ammeter 340 measures the current flowing in the inductance 350.

In the presence of a short-circuit, the control circuit 330 detects the rise in current by means of the ammeter 340. The control circuit 330 then controls the switch, by pulse width modulation, in order to regulate the current flowing in the inductance 350. During the opening phases of the switch 310, the free-wheeling diode 360 is conductive. It may be provided that (n–1) switches 310 of the n batteries 3 connected in parallel are maintained in the open position in short-circuit mode. It may also be provided that (n–x–1) switches 310 are maintained in the open position and that x switches 310 are maintained in the closed position in short-circuit mode. The opening of a final switch 310 is initiated by its control circuit 330 or by the control circuit 2, with a cyclical ratio which permits the regulation of the current flowing in the inductance 350 and, accordingly, in the circuit-breaker 5. The current flowing in the inductance 350 is maintained, for example, by the control circuit 330 at a level which ensures that the current flowing in the circuit-breaker 5 is lower than the breaking capacity thereof. The current flowing in the inductance 350 is also maintained at a level which ensures that the current flowing in the circuit-breaker 5 exceeds the tripping current thereof. In this way, the current flowing in the circuit-breaker may be regulated at a controlled level in relation to its tripping current. By maintaining an exact current required for the tripping of the circuit-breaker 5, the service life of the latter in response to repeated short-circuits can be extended.

Figure 11:
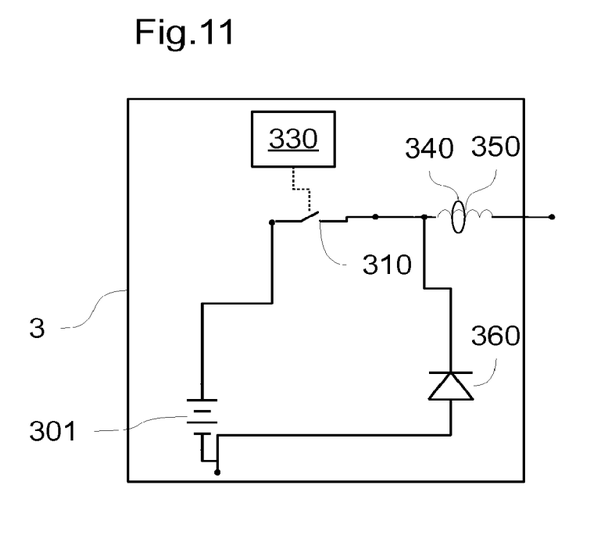

FIG. 11 is a schematic representation of a further variant of a battery 3, which is designed for the implementation of the third mode of embodiment of an electrical installation 1 according to the invention. The variant shown in FIG. 11 is distinguished from the variant shown in FIG. 10 by the absence of the converter structure 37. As in the variant shown in FIG. 10, this variant permits the regulation of the current flowing in the circuit-breaker 5 by the regulation of the current delivered by a battery 3, and by maintaining a number of switches 310 in other batteries 3 in the open position.

The circuit-breaker 5 is, for example, a magneto-thermal circuit-breaker or an electronic circuit-breaker. An electronic circuit-breaker is provided with:
- an ammeter for the measurement of the current flowing therein;
- an electromechanical element for opening between the terminals of the circuit-breaker;
- an electronic circuit for the processing of the current measurement of the ammeter, and the generation of an opening command in respect of the electromechanical element, depending upon the current measurement.

Figure 12:
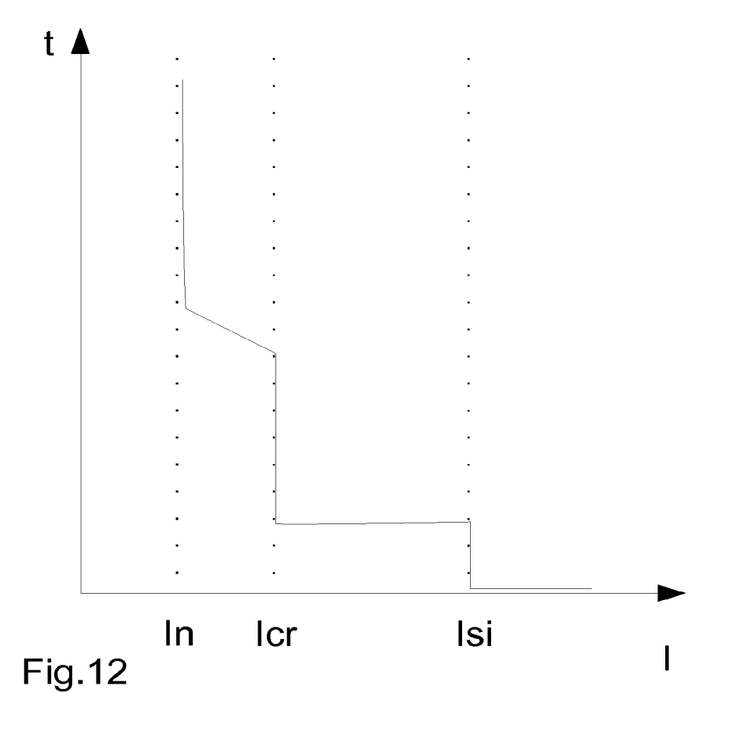
FIG. 12 is an example of a trip diagram for an example of a circuit-breaker which is suitable for use in an electrical installation according to the invention.

FIG. 12 shows an example of a trip diagram for an electronic circuit-breaker of this type. In this case, the electronic circuit-breaker is provided with three trip thresholds:
- the first trip threshold In for a current overload of limited magnitude but of prolonged duration (typically between several tens of seconds and several minutes). This trip threshold is analogous to the thermal trip threshold of a magneto-thermal circuit-breaker;
- the second trip threshold Icr for a current overload of relatively high magnitude and average duration (typically between 100 ms and several seconds). This trip threshold is analogous to the magnetic trip threshold of a magneto-thermal circuit-breaker;
- the third trip threshold Isi for a dead short, with virtually instantaneous detection, and opening within less than 100 ms of said detection.

The first trip threshold of the circuit-breaker 5 may be delayed in order to permit circuit-breakers of lower rating to open line sections down-circuit, thereby ensuring the selectivity of the electric circuit.

The control circuit 2 and the batteries connected in parallel may be configured to deliver a current which exceeds the third trip threshold in short-circuit mode, in order to preserve the full functionality of the circuit-breaker 5.

The invention claimed is:

1. An electrical installation, comprising:
a circuit-breaker with a breaking capacity PdC and a tripping current Is;
an ammeter for measurement of the current flowing in the circuit-breaker; and
a DC voltage source comprising electrochemical accumulator batteries connected in parallel, whereby said voltage source is connected in series with the circuit-breaker,
wherein a sum of the short-circuit currents of the batteries connected in parallel is greater than the breaking capacity PdC of the circuit-breaker, whereby a plurality of said batteries comprise a respective switch which is capable of opening a connection between their battery and the circuit-breaker, and
wherein the electrical installation comprises a control circuit which is configured for the detection of a current flowing in the circuit-breaker which exceeds the tripping current Is, and is configured to control the opening of a plurality of said switches in order to ensure that the current flowing in the circuit-breaker exceeds the tripping current Is thereof and is lower than the breaking capacity PdC thereof upon said detection.

2. The electrical installation as claimed in claim 1, wherein each of said batteries connected in parallel comprises one of said respective switches.

3. The electrical installation as claimed in claim 1, wherein fewer than half of said batteries connected in parallel comprise one of said respective switches.

4. The electrical installation as claimed in claim 1, wherein one of said batteries comprises an ammeter for the measurement of the current flowing in its respective switch, and comprises a control circuit for the control of the opening of the switch in order to regulate the current flowing in the switch to a level which is lower than the maximum short-circuit current.

5. The electrical installation as claimed in claim 1, wherein the tripping current Is of the circuit-breaker is a tripping current for a short-circuit of duration less than 100 ms.

6. The electrical installation as claimed in claim 1, further comprising at least 10 of the batteries connected in parallel.

7. The electrical installation as claimed in claim 1, further comprising a number n of the batteries connected in parallel, wherein each of said batteries exhibits a short-circuit current $Icc_i$, and wherein the breaking capacity PdC of the circuit-breaker is at least three times lower than the sum $$\sum_{i=1}^{n} Icc_i$$

of the short-circuit currents of said batteries.

8. The electrical installation as claimed in claim 1, wherein each of said switches incorporates a transistor in which the current delivered by its respective battery flows.

9. The electrical installation as claimed in claim 1, wherein each of said batteries comprises a first combination of electrochemical accumulators connected in series, and a second combination of electrochemical accumulators connected in series, and wherein the electrical installation also comprises a DC/DC converter an output voltage of which is connected in series with said first combination of electrochemical accumulators, wherein the second combination of electrochemical accumulators applies a potential difference to an input interface of the converter.

10. The electrical installation as claimed in claim 9, wherein said converter constitutes a voltage-reducing structure during the discharging of said second combination of electrochemical accumulators.

11. The electrical installation as claimed in claim 10, wherein:
said voltage-reducing structure incorporates a stepdown switching regulator comprising two controlled switches connected in series and to the terminals of which the potential difference of the second combination of electrochemical accumulators is applied;
said converter incorporates:

an inductance connected between a first terminal of the respective switch of the battery and a first output terminal of the DC voltage source, and a free-wheeling diode connected between a second output terminal of the DC voltage source and said first terminal of said respective switch; and the second terminal of the respective switch is connected to a connection node between the controlled switches of the reducer.

12. The electrical installation as claimed in claim 11, wherein said respective switches comprise at least one component for the blocking of the current flowing from said first terminal to said connection node between said two controlled switches.

13. The electrical installation as claimed claim 1, wherein the circuit-breaker has a breaking capacity at least equal to 5 kA.

* * * * *